US012151943B1

(12) United States Patent
Pumphrey et al.

(10) Patent No.: US 12,151,943 B1
(45) Date of Patent: Nov. 26, 2024

(54) SYSTEM AND METHOD FOR EXTRACTING BORIC ACID FROM A BORON SOLUTION

(71) Applicants: Kirk M. Pumphrey, San Jose, CA (US); Kenneth Aoki, Woodland, CA (US); Darrell R. Aoki, Woodland, CA (US)

(72) Inventors: Kirk M. Pumphrey, San Jose, CA (US); Kenneth Aoki, Woodland, CA (US); Darrell R. Aoki, Woodland, CA (US)

( * ) Notice: Subject to any disclaimer, the term of this patent is extended or adjusted under 35 U.S.C. 154(b) by 0 days.

(21) Appl. No.: 18/336,898

(22) Filed: Jun. 16, 2023

(51) Int. Cl.
*C01B 35/10* (2006.01)

(52) U.S. Cl.
CPC ................... *C01B 35/109* (2013.01)

(58) Field of Classification Search
None
See application file for complete search history.

(56) References Cited

U.S. PATENT DOCUMENTS

| | | | |
|---|---|---|---|
| 8,647,509 B2* | 2/2014 | Vora | B01D 61/0271 210/651 |
| 9,011,660 B2 | 4/2015 | Freydina et al. | |
| 9,665,852 B2 | 5/2017 | Underwood et al. | |
| 10,029,249 B1 | 7/2018 | Vittur et al. | |
| 10,604,424 B1 | 3/2020 | Wegner | |
| 11,014,830 B2 | 5/2021 | Mitchek et al. | |
| 2012/0234764 A1 | 9/2012 | Imada et al. | |
| 2014/0339162 A1 | 11/2014 | Cao et al. | |
| 2016/0340216 A1 | 11/2016 | Huang et al. | |
| 2017/0081215 A1* | 3/2017 | Broschek Santelices | B01D 15/361 |
| 2019/0263697 A1* | 8/2019 | Ganzi | C02F 9/00 |
| 2020/0299165 A1* | 9/2020 | Lahav | B01D 61/027 |
| 2022/0162104 A1 | 5/2022 | Takahashi et al. | |
| 2022/0281758 A1 | 9/2022 | Wallace | |
| 2022/0315468 A1* | 10/2022 | Chang | C04B 18/06 |

FOREIGN PATENT DOCUMENTS

| | | |
|---|---|---|
| EP | 3153476 A1 | 4/2017 |
| JP | 4825858 B2 | 9/2011 |
| RU | 2609473 C2 | 2/2017 |
| WO | WO-2018074984 A1 * | 4/2018 ........... B01D 61/022 |

OTHER PUBLICATIONS

Buch, K. Boric acid in sea water and its effect on the carbon dioxide equilibrium. Nature 131, 688 (1933). (Year: 1933).*

* cited by examiner

*Primary Examiner* — Anthony J Zimmer
*Assistant Examiner* — Eric Scott Sherman (57) ABSTRACT

In a method for extracting boric acid from boron solution, the boron solution is processed at a nanofiltration system, wherein the nanofiltration system generates a first permeate and a first concentrate. The first permeate is stored in a first storage tank. The first permeate is polished to generate a second permeate and a second concentrate. The second concentrate is stored in a second storage tank. The second concentrate is processed at a seawater processing system to generate a third concentrate and a third permeate, wherein the third concentrate comprises boric acid. The third concentrate is stored in a third storage tank.

18 Claims, 7 Drawing Sheets

SYSTEM AND METHOD FOR EXTRACTING BORIC ACID FROM A BORON SOLUTION

BACKGROUND

Boron is a highly soluble nutrient that is necessary in agricultural operations, and stimulates plant growth. However, Boron accumulation in agricultural settings can lead to significant decreases in crop yield, and in some instances crop failures. Since boron is highly soluble, high rainfall can lead to boron deficiency and drought situations can cause boron accumulation in the soil. After a drought, as accumulated boron gets absorbed into the soil, boron can lead to significant problems in crops planted in the soil, reducing yield and potentially leading to crop failure.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DESCRIPTION OF EMBODIMENTS

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "extracting," "performing," "injecting," "draining," "distributing," "monitoring," "ceasing," "activating," "operating," "returning," "receiving," "processing," "storing," "polishing," "passing," "adding," "adjusting," "executing," or the like, refer to the actions and processes of a system for extracting boron from feed water or a system for extracting boric acid from a boron solution.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments. It should be appreciated that the described embodiments may refer to components that can be controlled by, and otherwise actuated by, processor executable instructions.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the systems described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example system for extracting boron from feed water, according to embodiments. A description of an example system for extracting boric acid from a boron solution is then described, according to embodiments. A description of an example system for extracting boron from feed water and extracting boric acid from a boron solution is then provided, according to embodiments. Example operations for operating a system for extracting boron from feed water and example operations for operating a system for extracting boric acid from a boron solution are then described, according to embodiments.

While boron is a nutrient that is necessary to promote healthy plant growth, over accumulation of boron in plants can lead to boron toxicity, impacting plant yields and can even lead to crop loss. Furthermore, different regions can experience boron deficiency or boron accumulation, depending on geography, weather patterns, etc. The distribution of boron across agricultural regions varies, where some regions require boron as a fertilizer to crops, while other regions need to remove boron from feed water to avoid boron accumulation and toxicity for improving crop performance.

Embodiments described herein provide systems and methods for extracting boron from feed water. In accordance with the described embodiments, a pressurized vessel including a boron-selective resin is provided, where the pressurized vessel receives feed water (e.g., irrigation feed water) and filters out the boron using the boron-selective resin. The boron is stored in the resin bed while feed water is returned to the source of the feed water after boron filtration is performed without disruption to operations. At a certain point, for example upon determining that the resin bed is saturated such that no more boron can be extracted from the feed water, the pressurized vessel is disconnected or otherwise shut off from the feed water, where the feed water can continue operations without disruption.

In accordance with embodiments, a backwash operation is performed on the boron-saturated resin bed within the pressurized vessel, the resin bed including a boron-selective resin for extracting boron from feed water. An acid-based solution from a first storage tank is injected into the boron-saturated resin bed, causing the boron to be released from the resin bed and into a boron solution. The boron solution is drained from the pressurized vessel into a holding tank. In some embodiments, a boron concentration level of the boron solution is monitored during the draining of the boron solution from the pressurized vessel into the holding tank. Responsive to the boron concentration level falling below a threshold boron concentration level, the draining of the boron solution from the pressurized vessel into the holding tank is ceased. In some embodiments, subsequent ceasing the draining of the boron solution from the pressurized vessel into the holding tank, residual boron solution is drained into the first storage tank.

An acid displacement rinse operation is performed on the resin bed within the pressurized vessel. A caustic solution from a second storage tank is injected into the resin bed, the caustic solution recharging the resin bed for extracting boron from feed water. In some embodiments, the caustic solution injection into the resin bed is returned to the second storage tank. A caustic displacement rinse operation is performed on the resin bed for preparing the resin bed for receiving the feed water. A fast rinse operation is performed on the resin bed. Surplus water of the backwash operation, the acid displacement rinse operation, and the caustic displacement rinse operation are distributed to the source of the feed water.

In some embodiments, at least one of the backwash operation, the acid displacement rinse, and the caustic displacement rinse, is performed using reverse osmosis (RO) water. In some embodiments, runoff water of at least one of the backwash operation, the acid displacement rinse, and the caustic displacement rinse, is drained into and stored in a surplus tank. In some embodiments, runoff water of the backwash operation and the fast rinse operation are stored in a second surplus tank, separate from the surplus tank holding the runoff of the acid displacement rinse and the caustic displacement rinse. The surplus water of the backwash operation and the fast rinse operation can be processed at a reverse osmosis system for generating reverse osmosis water for providing the reverse osmosis water to future iterations of the backwash operation, the acid displacement rinse operation, the caustic displacement rinse operation, and the fast rinse operation.

Boron, in various concentrations, is useful as a fertilizer in regions suffering from boron deficiency. However, in lower concentrations, boron solutions may be economically disincentivized due to the transportation costs of the solutions. Embodiments described herein provide for the extraction of boric acid from a boron solution (e.g., boron suspended in water).

In accordance with the described embodiments, a boron solution is processed at a nanofiltration system, generating a first concentrate and a first permeate. The first permeate is stored in a first storage tank. In some embodiments, while in the first storage tank, the pH of the first permeate is adjusted to a predetermined pH level. The first permeate is then polished by a polisher, generating a second permeate and a second concentrate. In some embodiments, the polisher is the nanofiltration system, such that the first permeate is processed by the nanofiltration system. The second concentrate is stored in a second storage tank. In some embodiments, while in the second storage tank, the pH of the second concentrate is adjusted to a predetermined pH level. The second concentrate is then processed at a seawater processing system to generate a third concentrate and a third permeate, where the third concentrate includes boric acid. The third concentrate is stored in a third storage tank. It should be appreciated that the boric acid of the third concentrate is at concentration that does not cause the boric acid to fall out of solution.

In some embodiments, the pH level of at least one of the first permeate in the first storage tank and the second concentrate in the second storage tank is adjusted by adding a hydroxide. For example, the hydroxide can include potassium hydroxide (KOH), sodium hydroxide (NaOH), sodium carbonate ($Na_2CO_3$). In some embodiments, at least one of the first concentrate, the second permeate, and the third permeate, are distributed to a source of the feed water.

It should be appreciated that various components of the above-described systems can be collocated at a single site or distributed at multiple sites. For example, in one embodiment, a system for extracting boron from feed water can be located at an agricultural operation, such as an orchard. In such an embodiment, boron is extracted from the feed water and stored as a boron solution in a holding tank. In another example, the pressurized vessel including the boron-selective resin bed, is detachable from the rest of the system for extracting boron from feed water, and transported to a second site for boron extraction. In such an embodiment, the pressurized vessel can be detached without disrupting normal operations for transport to the second site. Another pressurized vessel can be connected to the first site while boron is extracted from the resin bed within the pressurized vessel at the second site. These embodiments reduce the cost of boron extraction by reducing components without comprising performance. Moreover, the system for extracting boric acid from a boron solution can be collocated with the system for extracting boron from feed water, or can be at a remote location.

It should be further appreciated that the embodiments described herein provide systems for extracting boron from feed water and extracting boric acid from a boron solution that are substantially zero waste. For instance, the drained fluids from the described systems are stored for further processing or distributed to a source of the feed water, without directing any of the liquids to wastewater systems, as the described systems are substantially closed looped systems where all drained liquids can be stored for later use or returned directly to the source of the feed water. As such, the described systems are particularly useful in irrigation and farming operations by reusing the processed liquids and reducing waste.

Example System for Extracting Boron from Feed Water

Figure 1A:
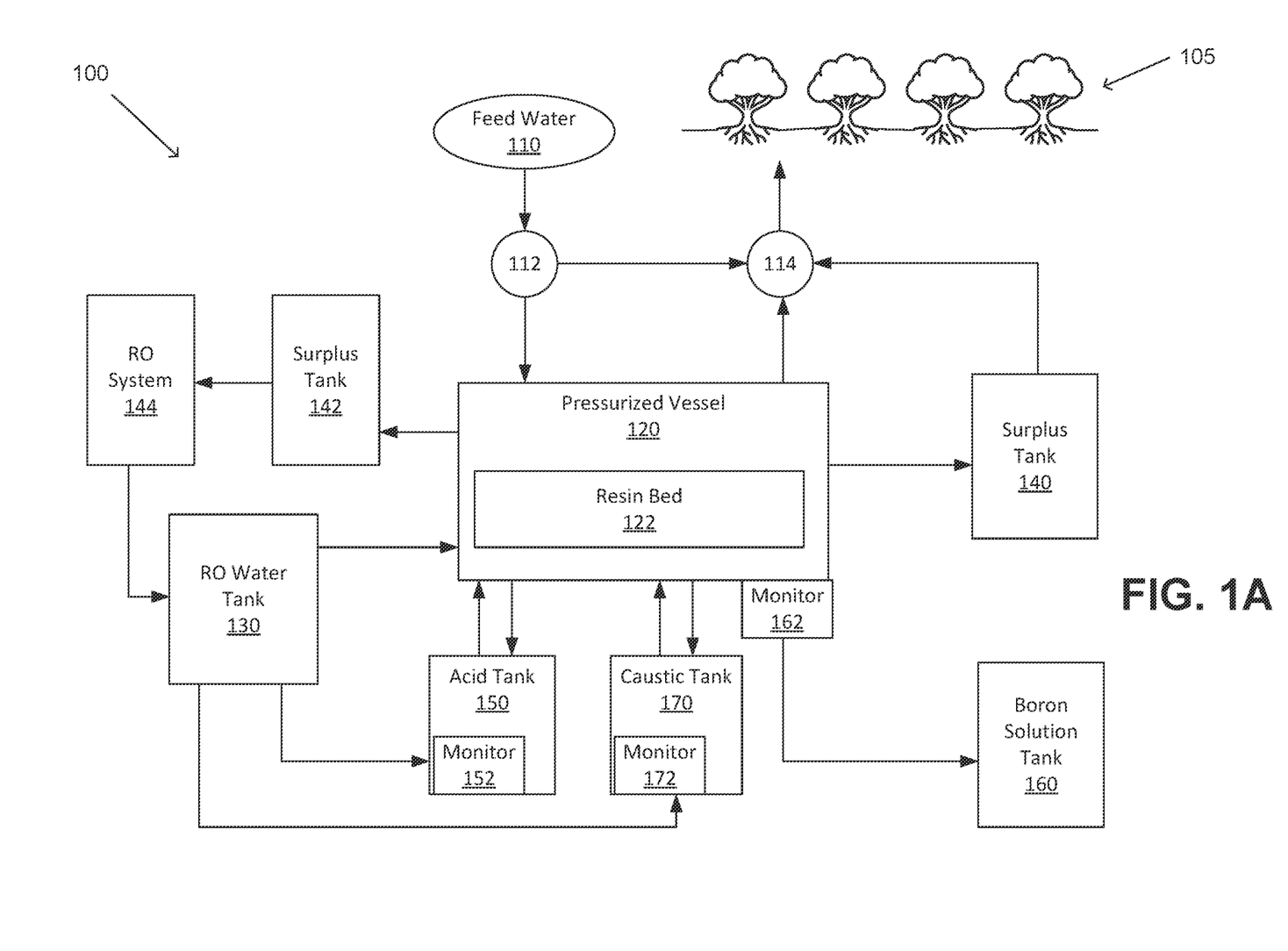
FIG. 1A is a block diagram of an example system for extracting boron from feed water, according to embodiments.

Turning now to the figures, FIG. 1A is a block diagram of an example system 100 for extracting boron from feed water, according to embodiments. In accordance with various embodiments, system 100 includes pressurized vessel 120, reverse osmosis (RO) water tank 130, at least one surplus tank 140, acid tank 150, caustic tank 170, and boron solution tank 160.

Feed water 110 is distributed to pressurized vessel 120. It should be appreciated that feed water 110 can be any source of water that might include boron, where boron is an element that has many uses, including as a nutrient in agricultural operations. For example, feed water 110 may be irrigation runoff water from an orchard or field of crops (e.g., orchard 105). In some embodiments, switches 112 and 114 are used for directing feed water to pressurized vessel 120 or for closing off the connection to pressurized vessel 120, and diverting feed water elsewhere, such as a source of the feed water. During boron removal from feed water 110, switch 112 directs feed water 110 into pressurized vessel 120, for example using a pump (not shown), where feed water 110 flows through pressurized vessel 120 and out through switch 114, distributing feed water to an output (e.g., orchard 105).

Pressurized vessel 120 includes a resin bed 122 comprised of a boron-selective resin (e.g., a boron-selective ion exchange resin) for extracting boron from feed water 110. As feed water 110 flows through resin bed 122 within pressurized vessel 120, boron is pulled out of feed water 110 and held in resin bed 122 via ion exchange, thus removing boron from feed water 110. Resin bed 122 operates as a filter, removing boron from feed water 110 as it is distributed from a source to a destination (e.g., orchard 105). During the boron removal from feed water 110, the concentration of boron in resin bed 122 will increase over time, as a function of the volume of feed water 110, the amount and surface area of the boron-selective resin, and the amount of time feed water 110 passes over the surface area of the boron-selective resin.

Figure 1B:
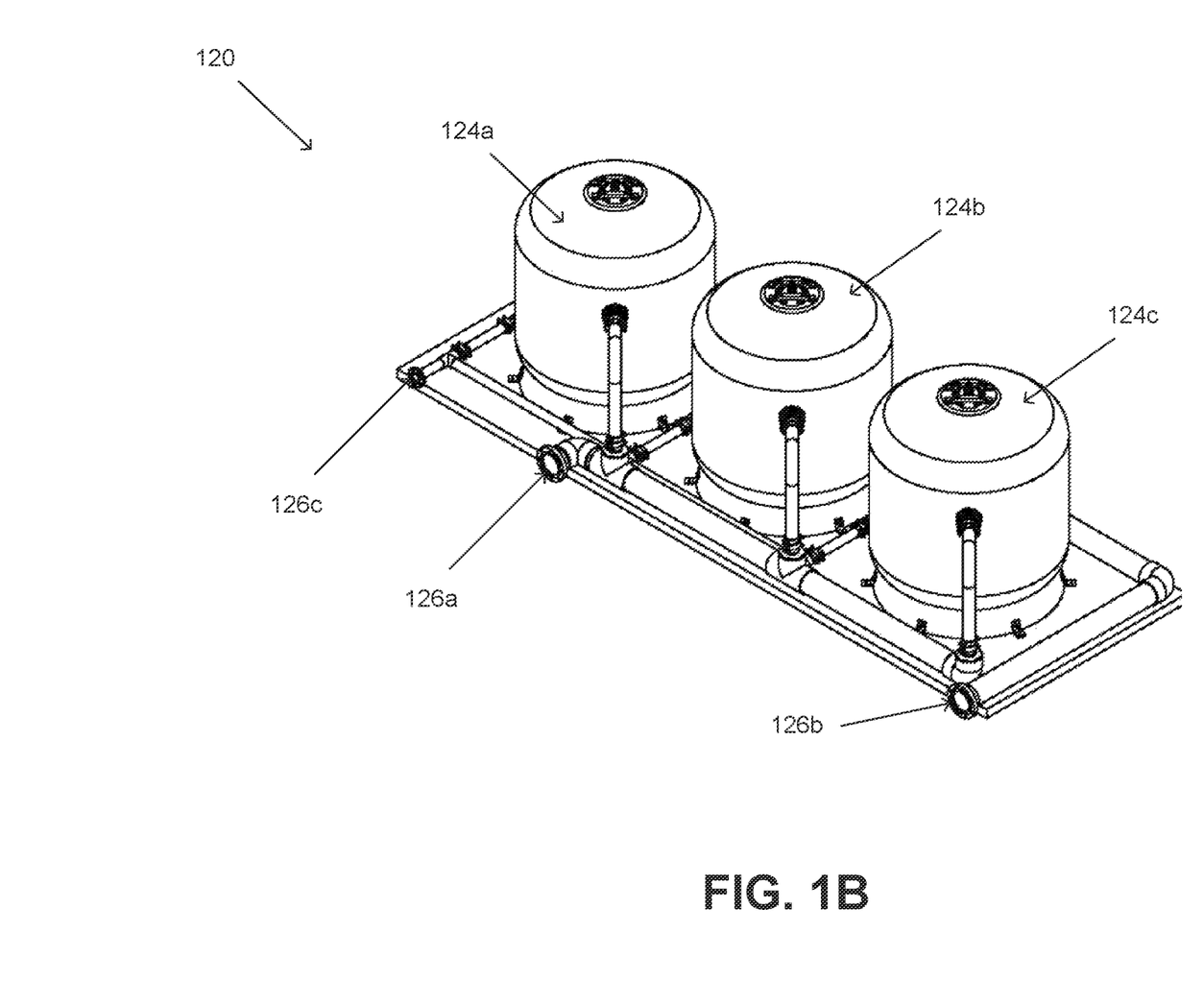
FIG. 1B is an illustration of an example pressurized vessel including three tanks operating in parallel, according to embodiments.

With reference to FIG. 1B, an illustration of an example pressurized vessel 120 including three tanks operating in parallel, according to embodiments, is shown. As illustrated, the example pressurized vessel 120 includes tanks 124a, 124b, and 124c, which are connected to each other in parallel. Three parallel input/output connections 126a, 126b, and 126c are illustrated, in which each of input/output connections 126a, 126b, and 126c provides parallel inputs and outputs to tanks 124a, 124b, and 124c. It should be appreciated that pressurized vessel 120 can include any number of constituent tanks operating in parallel, of which the illustrated embodiment is one example.

Returning to FIG. 1A, as the concentration of boron increases within resin bed 122, over time the efficacy of the boron-selective resin will decrease, and less boron will be removed from feed water 110. At a certain point, switches 112 and 114 are used to disconnect feed water 110 from pressurized vessel 120, directing feed water 110 elsewhere, allowing for the extraction of boron from resin bed 122, and recharging resin bed 122 for use in extraction of boron from feed water 110. It should be appreciated that the determination as to when to perform boron extraction can be based on a monitored level of boron concentration in feed water 110 exiting pressurized vessel 120, based on the time of boron removal (e.g., calculated based on the volume of relative the boron-selective surface area of resin bed 122), or any other determination.

In one embodiment, at the onset of the boron extraction operation to remove boron from resin bed 122, a backwash operation is performed on the boron-saturated resin bed 122. In some embodiments, the backwash operation is performed by injecting RO water from RO water tank 130 into pressurized vessel 120 through a lower opening of pressurized vessel 120, where the RO water flows through resin bed 122, and out another opening of pressurized vessel 120. In one embodiment, the output of the backwash operation is drained into surplus tank 140. In another embodiment, the output of the backwash operation is drained into surplus tank 142.

An acid-based solution from acid tank 150 is then injected into boron-saturated resin bed 122, causing the boron to be released from resin bed 122 and into a boron solution. It should be appreciated that the acid can be any kind of acid, including without limitation: sulfuric acid, hydrochloric acid, etc. The concentration of the acid-based solution within acid tank 150 is maintained by mixing an acid with RO water from RO water tank 130. In one embodiment, monitor 152 monitors the concentration of acid within the acid-based solution, so that the appropriate amount of RO water can be mixed into acid tank 150 (either manually or automatically) to maintain the desired concentration of acid. The boron solution is drained during the injection of the acid-based solution into boron solution tank 160. In some embodiments, the boron solution includes water, boron, and sulfuric acid ($H_2SO_4$).

In one embodiment, during the draining of the boron solution into boron solution tank 160, a boron concentration level of the boron solution is monitored at monitor 162. In response to the boron concentration level falling below a threshold boron concentration level, the draining of the boron solution from pressurized vessel 120 into boron solution tank 160 is ceased. In other embodiments, after the lapsing of a period of time or determining a particular volume of boron solution has been drained into boron solution tank 160, the draining of the boron solution from pressurized vessel 120 into boron solution tank is ceased. In one embodiment, after ceasing the draining of the boron solution into boron solution tank 160, the boron solution is drained back into acid tank 150. It should be appreciated that in such embodiments, the boron solution drained back into acid tank 150 is substantially acid with a low concentration of boron, and that the acid can be reused for further operations in acid tank 150.

After the boron solution is drained from pressurized vessel 120, an acid displacement rinse operation is performed within the pressurized vessel 120. In one embodiment, the acid displacement rinse operation is performed using RO water from RO water tank 130. The acid displacement rinse operation runs water through pressurized vessel 120 for an amount of time, removing excess acid-based solution and boron solution from pressurized vessel 120, with output of the acid displacement rinse operation being drained into surplus tank 140.

An caustic solution from caustic tank 170 is then injected into resin bed 122, where the caustic solution recharges resin bed 122 for extracting the boron from feed water 110, allowing system 100 to perform additional boron removal from feed water 110. It should be appreciated that the hydroxide can be any kind of hydroxide (or base), including without limitation: potassium hydroxide (KOH), sodium hydroxide (NaOH), sodium carbonate ($Na_2CO_3$), soda ash, etc. The concentration of the caustic solution within caustic tank 170 is maintained by mixing a hydroxide with RO water from RO water tank 130. In one embodiment, monitor 172 monitors the concentration of hydroxide within the caustic solution, so that the appropriate amount of RO water can be mixed into caustic tank 170 (either manually or automatically) to maintain the desired concentration of hydroxide. The output of the caustic solution is returned to caustic tank 170 for future use in recharging resin bed 122.

After the caustic solution is drained from pressurized vessel 120, a caustic displacement rinse operation is performed within the pressurized vessel 120. In one embodiment, the caustic displacement rinse operation is performed using RO water from RO water tank 130. The caustic displacement rinse operation runs water through pressurized vessel 120 for an amount of time, removing excess caustic solution from pressurized vessel 120, with output of the caustic displacement rinse operation being drained into surplus tank 140.

A fast rinse operation on resin bed 122 is then performed, injecting water into pressurized vessel 120 and through resin bed 122, preparing the boron-selective resin for removing boron from feed water 110. In one embodiment, the fast rinse operation is performed using RO water from RO water tank 130. It should be appreciated that the fast rinse operation is shorter in time than the backwash operation, and/or has an input flow rate (e.g., of RO water) that is higher than the input flow rate of the backwash operation. It should also be appreciated that, in some embodiments, the backwash operation has an input flow rate higher than an input flow rate of the injecting the acid solution and an input flow rate of the injecting the caustic solution.

In some embodiments, the fast rinse operation is performed by injecting RO water from RO water tank 130 into pressurized vessel 120 through a lower opening of pressurized vessel 120, where the RO water flows through resin bed 122, and out another opening of pressurized vessel 120. In one embodiment, the output of the fast rinse operation is drained into surplus tank 140. In another embodiment, the output of the fast rinse operation is drained into surplus tank 142.

Output of surplus tank 140 is distributed to a source of feed water 110 (e.g., orchard 105). It should be appreciated that the water stored in surplus tank 140 is generally usable for normal irrigation operations. In some embodiments, surplus tank 140 includes the output water of the backwash operation, the acid displacement rinse operation, the caustic displacement rinse operation, and the fast rinse operation. In other embodiments, surplus tank 140 includes the output water of the acid displacement rinse operation and the caustic displacement rinse operation, while surplus tank 142 includes the output water of the backwash operation and the fast rinse operation. The output of surplus tank 142 can be processed at an RO system 144 for generating RO water. The RO water generated at RO system 144 can be drained into and stored into RO water tank 130 for use in further operations of system 100.

It should be further appreciated that the operations of system 100 are substantially zero waste, in that most of the system outputs are reused either within system 100 or returned to the source of feed water 110, with the boron solution within boron solution tank 160 being used for further processing. No fluids or other outputs are directed to wastewater systems, as system 100 is a substantially closed looped system where all drained liquids can be stored for later use or returned directly to the source of feed water 110. As such, system 100 is particularly useful in irrigation and farming operations by reusing the processed liquids and reducing waste.

Example System for Extracting Boric Acid from a Boron Solution

Figure 2:
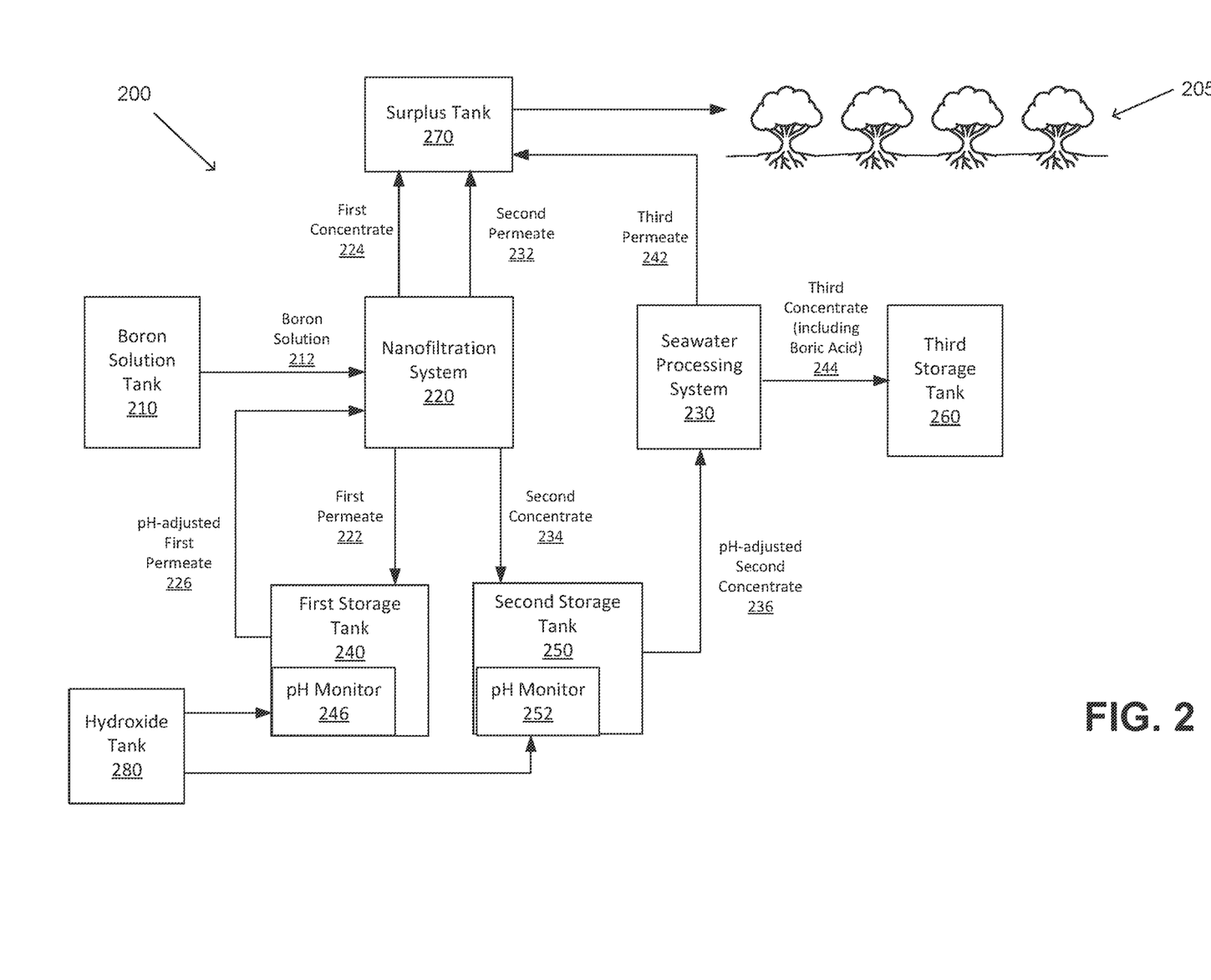
FIG. 2 is a block diagram of an example system for extracting boric acid from a boron solution, according to embodiments.

Boric acid, in various concentrations, is useful as a fertilizer in regions suffering from boron deficiency. Embodiments described herein provide for the extraction of boric acid from a boron solution (e.g., boron suspended in water). FIG. 2 is a block diagram of an example system 200 for extracting boric acid from a boron solution, according to embodiments. In accordance with various embodiments, system 100 includes boron solution tank 210, nanofiltration system 220, and seawater processing system 230.

Boron solution tank 210 includes a boron solution, from which system 200 uses as input for extracting boric acid. In some embodiments, boron solution tank 210 is boron solution tank 160 of FIG. 1A. For example, system 100 and system 200, or components thereof, may be collocated.

Boron solution 212 is received at nanofiltration system 220 from boron solution tank 210 for processing. The boron solution is processed at nanofiltration system 220, where nanofiltration system 220 generates first permeate 222 and first concentrate 224. It is understood that a permeate is a portion of boron solution 212 that passes through a permeable membrane, while a concentrate is the portion of boron solution 212 that does not pass through a membrane. First permeate 222 is distributed to and stored in first storage tank 240. In one embodiment, first concentrate 224 is stored in surplus tank 270.

In some embodiments, a pH level of first permeate 222 is adjusted in first storage tank 240 to achieve a predetermined pH level. For example, processing boron solution 212 at nanofiltration system 220 can reduce the pH level of first permeate 222, and the pH level of first permeate 222 is raised in first storage tank 240 to achieve the predetermined pH level. In one embodiment, pH monitor 246 within first storage tank 240 monitors the pH level of first permeate 222. In some embodiments, the pH level is adjusted by adding hydroxide from hydroxide tank 280. In some embodiments, hydroxide tank 280 is caustic tank 170 of FIG. 1A.

pH-adjusted first permeate 226 is polished at nanofiltration system 220 to generate second permeate 232 and second concentrate 234. It should be appreciated that the second pass at nanofiltration system 220 is referred to as polishing. It should be further appreciated that pH-adjusted first permeate 226 can be polished at another filtration system or polisher, in accordance with other embodiments. Second concentrate 234 is distributed to and stored in second storage tank 250. In one embodiment, second permeate 232 is stored in surplus tank 270.

In some embodiments, a pH level of second concentrate 234 is adjusted in second storage tank 250 to achieve a predetermined pH level. For example, processing second concentrate 234 at nanofiltration system 220 can reduce the pH level of second concentrate 234, and the pH level of second concentrate 234 is raised in second storage tank 250 to achieve the predetermined pH level. In one embodiment, pH monitor 252 within second storage tank 250 monitors the pH level of second concentrate 234. In some embodiments, the pH level is adjusted by adding hydroxide from hydroxide tank 280. In some embodiments, hydroxide tank 280 is caustic tank 170 of FIG. 1A.

pH-adjusted second concentrate 236 is processed at seawater processing system 230 to generate third permeate 242 and third concentrate 244, where third concentrate 244 includes boric acid. It should be appreciated that the boric acid of the third concentrate is at concentration that does not cause the boric acid to fall out of solution. A seawater processing system is any system that removes minerals from saline water. Third concentrate 244 is distributed to and stored in third storage tank 260. In one embodiment, third permeate 242 is stored in surplus tank 270. In accordance with some embodiments, the contents of surplus tank 270, including at least one of first concentrate 224, second permeate 232, and third permeate 242, can be returned to a source of feed water (e.g., an orchard 205). It should be appreciated that in accordance with some embodiments, orchard 205 can be orchard 105 of FIG. 1A. In some embodiments, the output of surplus tank 270 can be passed through a resin bed (e.g., resin bed 122 of FIG. 1A) prior to the distributing the first concentrate to source of the feed water. In some embodiments, surplus tank 270 is surplus tank 140 of FIG. 1A.

It should be further appreciated that the operations of system 200 are substantially zero waste, in that most of the system outputs are reused either within system 200 or returned to the source of feed water, with the boric acid stored within third storage tank 260 being reserved for use fertilizer in agricultural operations. It should be appreciated that third storage tank 260, or the contents thereof, can be transported to other locations for use. No fluids or other outputs are directed to wastewater systems, as system 200 is a substantially closed looped system where all drained liquids can be stored for later use or returned directly to the source of feed water. As such, system 200 is particularly useful in irrigation and farming operations by reusing the processed liquids and reducing waste.

Figure 3:
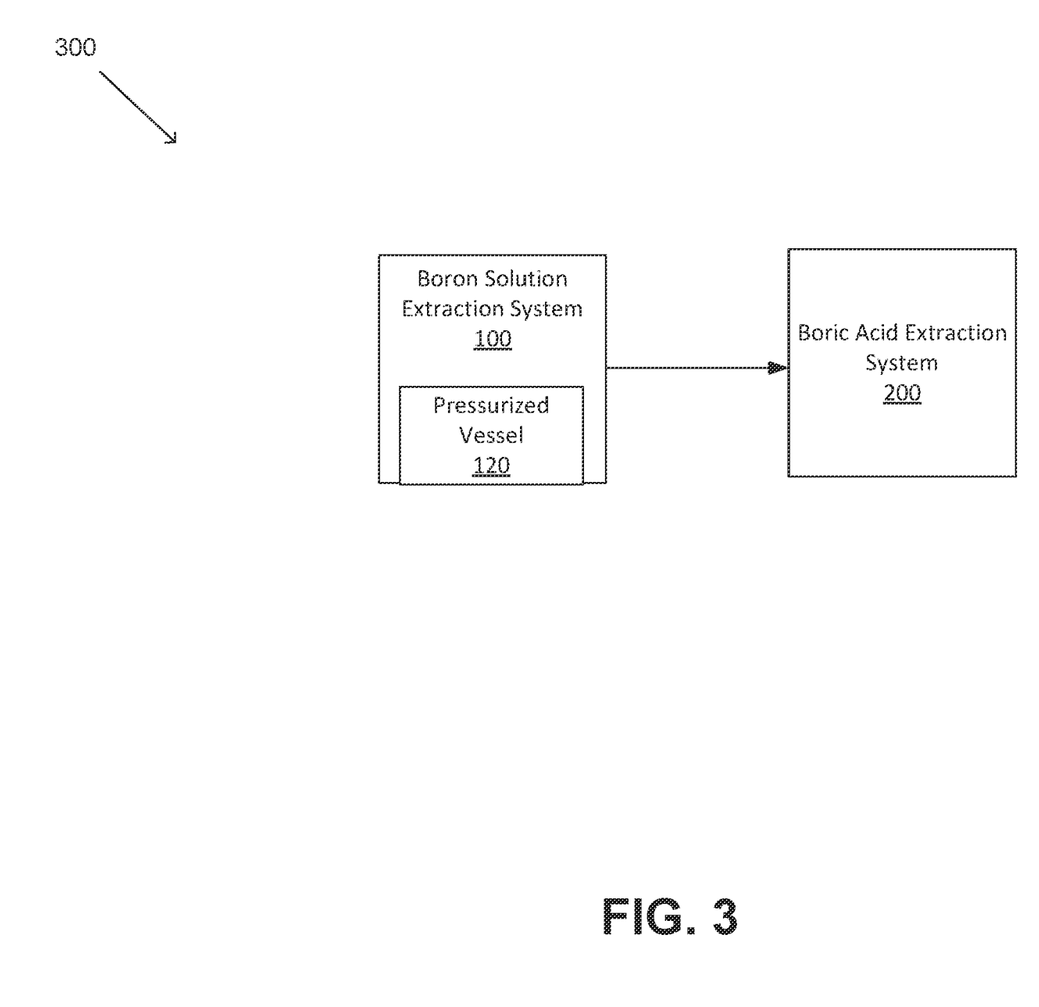
FIG. 3 is a block diagram of an example system for extracting boron from feed water and extracting boric acid from a boron solution, according to embodiments.

FIG. 3 is a block diagram of an example system 300 for extracting boron from feed water and extracting boric acid from a boron solution, according to embodiments. System 300 includes system 100 for extracting boron from feed water and system 200 for extracting boric acid from a boron solution. As illustrated, system 100 includes pressurized vessel 120.

It should be appreciated that the components of system 300 can be collocated at a single site or distributed at multiple sites. For example, in one embodiment, a system 100 for extracting boron from feed water can be located at an agricultural operation, such as an orchard. In such an embodiment, boron is extracted from the feed water and stored as a boron solution in a holding tank. In another example, the pressurized vessel 120 including the boron-selective resin bed, is located at an agricultural operation site, in-line with irrigation operations, for extracting boron from feed water for the irrigation operations. In such an embodiment, pressurized vessel 120 is detachable from the irrigation operations, and can be transported to a second site including the rest of the components of system 100. For example, pressurized vessel 120 can reside on a trailer for connection to a vehicle for transporting pressurized vessel 120 to a site where the rest of the components of system 100 is located. Pressurized vessel 120 is then connected to the rest of the components of system 100 for boron solution extraction and recharging of the resin bed. Pressurized vessel 120 can then be returned to the agricultural operation site, or another site, for removal of boron from feed water.

In such an embodiment, the pressurized vessel can be detached from the agricultural operation site without disrupting normal operations. Another pressurized vessel can be connected to the agricultural operation site while boron is extracted from the resin bed within the pressurized vessel at the second location. These embodiments reduce the cost of boron extraction by reducing components without compromising performance. Moreover, the system for extracting boric acid from a boron solution can be collocated with the system for extracting boron from feed water, or can be at a remote location.

The components of system 200 can be collocated with the components of system 100, or can be located at separate sites, for performing boric acid extraction. For example, where systems 100 and systems 200 are collocated, the water distributed to the source of the feed water can be returned to the same source. For example, some embodiments provide a system 300 for boron extraction and boric acid generation comprising of a mobile pressurized vessel 120 having a resin bed for boron extraction from irrigation runoff that can be connected to an irrigation system. Once boron extraction is complete (e.g., the resin bed has reached boron saturation), the mobile pressurized vessel 120 is removed from the irrigation system and transported to a second location. At the second location, the mobile pressurized vessel 120 is connected to a system 100 for extracting the boron from the resin bed into a boron solution and for recharging the resin bed, such that the resin bed can capture more boron. The mobile pressurized vessel 120 can then be returned to the original (or another) site for connection to an irrigation system. The extracted boron solution can then be processed to generate boric acid, for use in boron deficient farming environments.

Example Methods of Operation

Figure 4A:
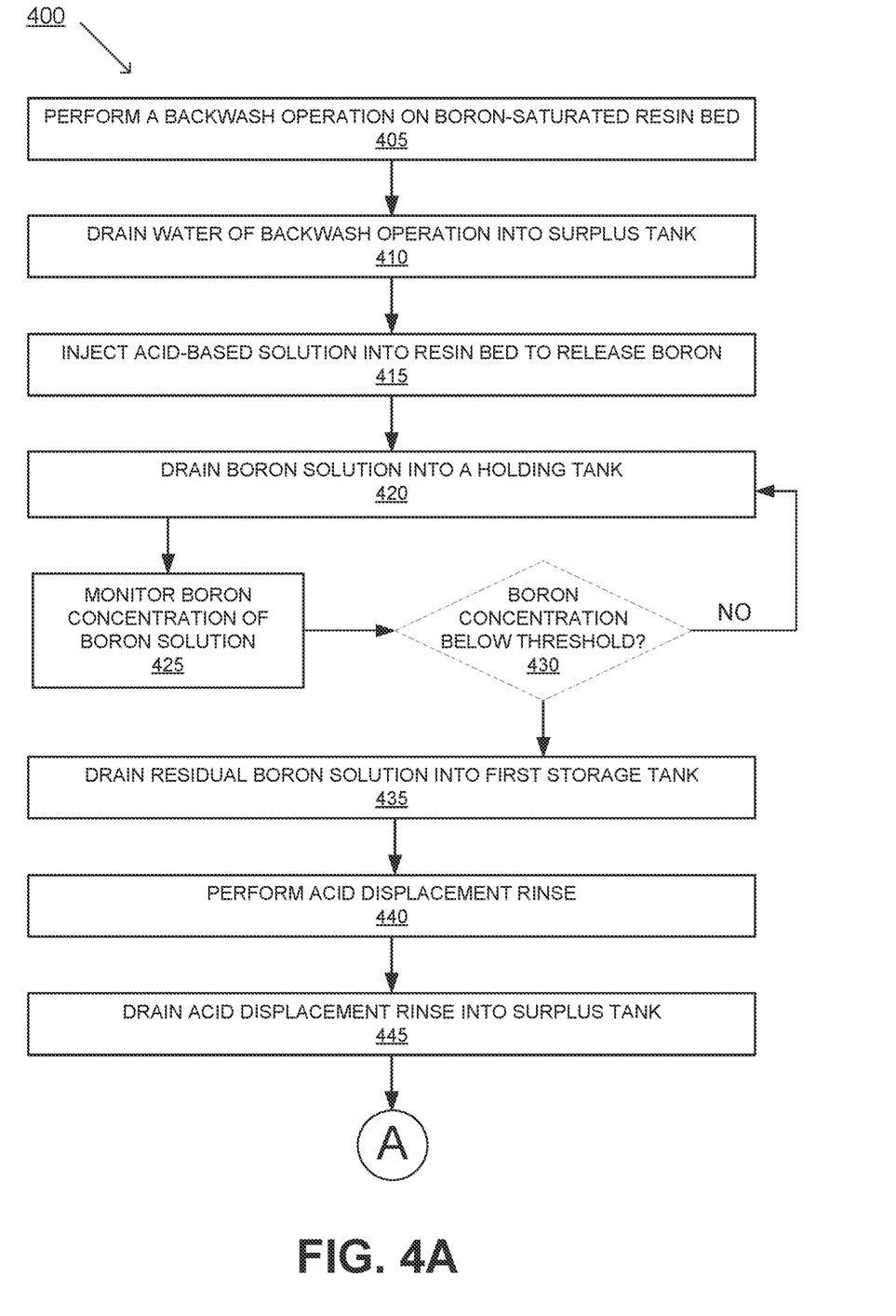
FIGS. 4A and 4B are a flow diagram of an example method for extracting boron from feed water, according to embodiments.
Figure 4B:
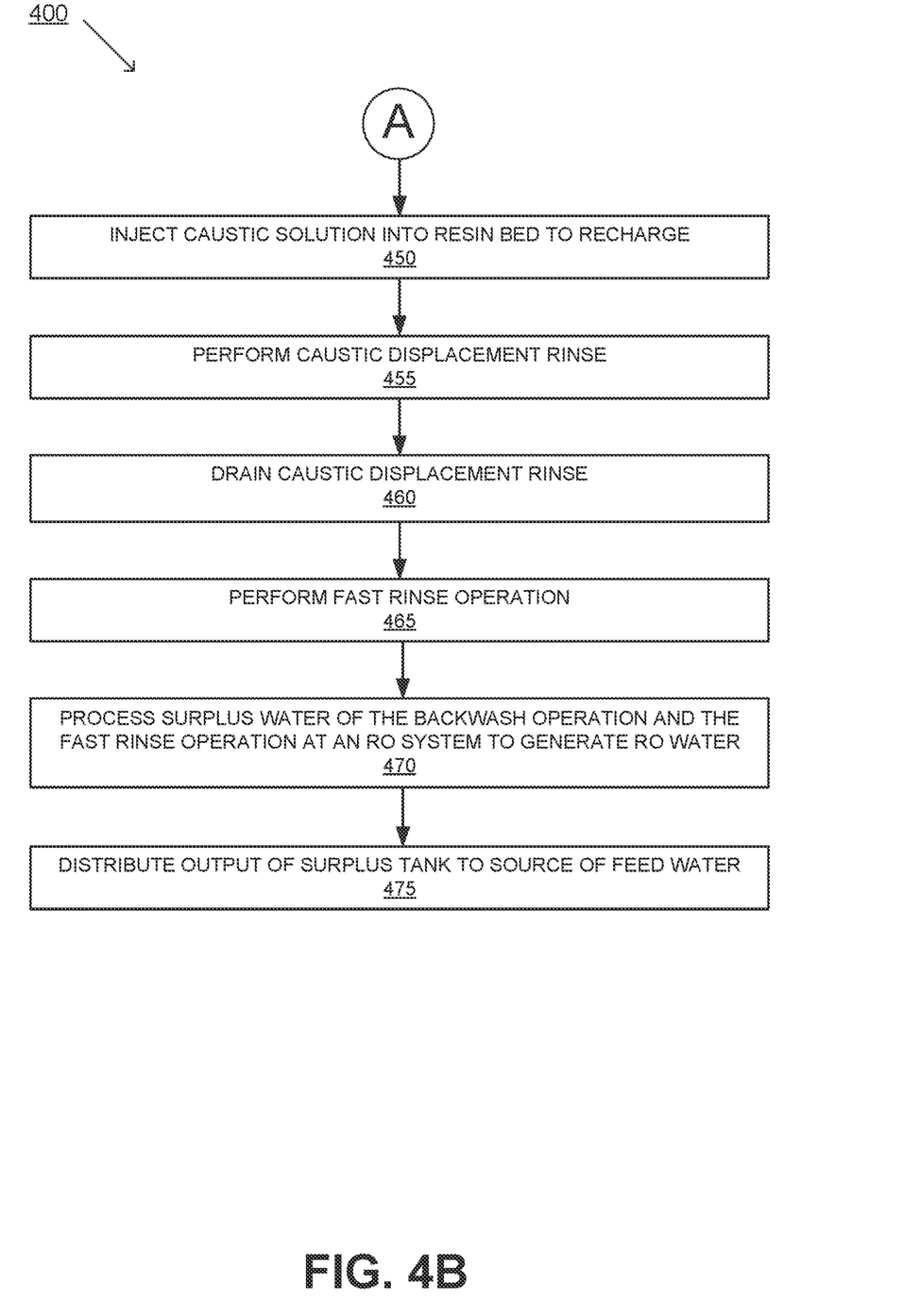
Figure 5:
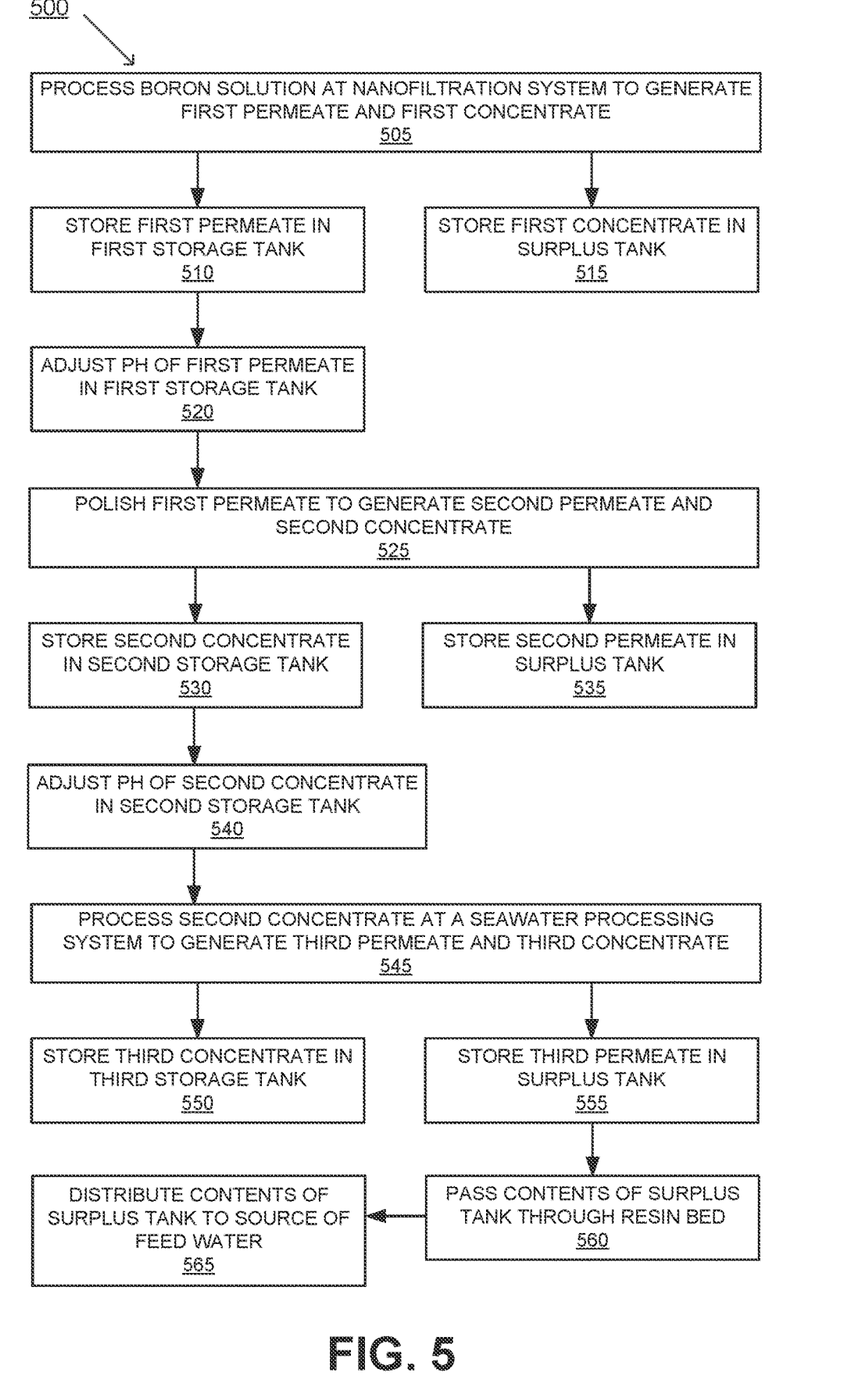
FIG. 5 is a flow diagram of an example method for extracting boric acid from a boron solution, according to embodiments.

FIGS. 4A and 4B illustrate flow diagrams of an example method for extracting boron from feed water, and FIG. 5 illustrates a flow diagram of an example method for extracting boric acid from boron solution, according to various embodiments. Procedures of these methods will be described with reference to elements and/or components of various figures described herein. Although specific procedures are disclosed in the flow diagrams, such procedures are examples. That is, embodiments are well suited to performing various other procedures or variations of the procedures recited in the flow diagrams. It is appreciated that in some embodiments, the procedures may be performed in a different order than described, that some of the described procedures may not be performed, and/or that one or more additional procedures to those described may be performed.

The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software. In accordance with some embodiments, the described procedures and operations can be effectuated manually, automatically under control of a computer system, or a combination thereof. For example, an operation can be monitored by components of the described systems (e.g., flow rates, saturation or concentration levels, etc.) and a procedure can be automatically executed based on the monitoring. It will be understood that in some embodiments, automatic execution of procedures may be based on operational informational of the described systems.

With reference to FIG. 4A, flow diagram 400 illustrates an example process for extracting boron from feed water, according to some embodiments. At procedure 405 of flow diagram 400, a backwash operation is performed on the boron-saturated resin bed within the pressurized vessel, the resin bed including a boron-selective resin for extracting boron from feed water. In one embodiment, the backwash operation includes injecting reverse osmosis water into the pressurized vessel through a lower opening in the pressurized vessel. At procedure 410, water of the backwash operation is drained into a surplus tank.

At procedure 415, an acid-based solution is injected from a first storage tank is injected into the boron-saturated resin bed within the pressurized vessel, causing the boron to be released from the resin bed and into a boron solution. In one embodiment, the acid-based solution is injected into the pressurized vessel through an upper opening in the pressurized vessel.

At procedure 420, the boron solution is drained from the pressurized vessel into a holding tank. In one embodiment, the boron solution is drained through a lower opening in the pressurized vessel. In some embodiments, as shown at procedure 425, a boron concentration level of the boron solution is monitored during the draining of the boron solution from the pressurized vessel into the holding tank. At procedure 430, it is determined whether the boron concentration level has fallen below a threshold boron concentration level. Provided the boron concentration level has not fallen below a threshold boron concentration level, flow diagram 400 continues at procedure 420. Responsive to the boron concentration level falling below a threshold boron concentration level, as shown at procedure 435, the draining of the boron solution from the pressurized vessel into the holding tank is ceased and subsequent ceasing the draining of the boron solution from the pressurized vessel into the holding tank, residual boron solution is drained into the first storage tank.

At procedure 440, an acid displacement rinse operation is performed on the resin bed within the pressurized vessel. In one embodiment, the acid displacement rinse operation is performed using reverse osmosis (RO) water. In one embodiment, as shown at procedure 445, the acid displacement rinse is drained into a surplus tank.

With reference to FIG. 4B, flow diagram 400 continues at procedure 450, where a caustic solution from a second storage tank is injected into the resin bed, the caustic solution recharging the resin bed for extracting boron from feed water. In some embodiments, the caustic solution injection into the resin bed is returned to the second storage tank. In one embodiment, the caustic solution comprises a hydroxide. In one embodiment, the hydroxide comprises at least one of: potassium hydroxide (KOH), sodium hydroxide (NaOH), sodium carbonate ($Na_2CO_3$).

At procedure 455, a caustic displacement rinse operation is performed on the resin bed for preparing the resin bed for receiving the feed water. In one embodiment, the caustic displacement rinse operation is performed using reverse osmosis (RO) water. In one embodiment, as shown at procedure 460, the caustic solution injected into the resin bed is drained into the second storage tank. At procedure 465, a fast rinse operation is performed on the resin bed. In one embodiment, the fast rinse operation has an input flow rate higher than the input flow rate of the backwash operation.

In some embodiments, as shown at procedure 470, surplus water of the backwash operation and the fast rinse operation is processed at a reverse osmosis system for generating reverse osmosis water for providing the reverse osmosis water to the backwash operation, the acid displacement rinse operation, the caustic displacement rinse operation, and the fast rinse operation.

In some embodiments, as shown at procedure 475, output of the surplus tank is distributed to a source of feed water. It should be appreciated that the water stored in surplus tank is generally usable for normal irrigation operations. In some embodiments, the surplus tank includes the output water of the backwash operation, the acid displacement rinse operation, the caustic displacement rinse operation, and the fast rinse operation. In other embodiments, the surplus tank includes the output water of the acid displacement rinse operation and the caustic displacement rinse operation, while another surplus tank includes the output water of the backwash operation and the fast rinse operation for performing procedure 470.

FIG. 5 is a flow diagram 500 of an example method for extracting boric acid from a boron solution, according to embodiments. At procedure 505 of flow diagram 500, a boron solution is processed at a nanofiltration system, generating a first concentrate and a first permeate. At procedure 510, the first permeate is stored in a first storage tank. In some embodiments, as shown at procedure 515, the first concentrate is stored in a surplus tank. In some embodiments, as shown at procedure 520, while in the first storage tank, the pH of the first permeate is adjusted to a predetermined pH level. In some embodiments, the pH level of the first permeate in the first storage tank is adjusted by adding a hydroxide.

At procedure 525, the first permeate is polished by a polisher, generating a second permeate and a second concentrate. In some embodiments, the polisher is the nanofiltration system, such that the first permeate is processed by the nanofiltration system. At procedure 530, the second concentrate is stored in a second storage tank. In some embodiments, as shown at procedure 535, the second permeate is stored in the surplus tank. In some embodiments, as shown at procedure 540, while in the second storage tank, the pH of the second concentrate is adjusted to a predetermined pH level. In some embodiments, the pH level of the second concentrate in the second storage tank is adjusted by adding a hydroxide.

At procedure 545, the second concentrate is processed at a seawater processing system to generate a third concentrate and a third permeate, where the third concentrate includes boric acid. It should be appreciated that the boric acid of the third concentrate is at concentration that does not cause the boric acid to fall out of solution. At procedure 550, the third concentrate is stored in a third storage tank. In some embodiments, as shown at procedure 555, the third permeate is stored in the surplus tank. In some embodiments, as shown at procedure 560, the contents of the surplus tank are passed through a resin bed, wherein the resin bed comprises boron-selective resin for extracting boron from feed water. At procedure 565, the contents of the surplus tank are distributed to a source of feed water.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for extracting boric acid from a boron solution, the method comprising:
   processing the boron solution using a nanofiltration system, wherein the nanofiltration system generates a first permeate and a first concentrate;
   storing the first permeate in a first storage tank;
   polishing the first permeate using the nanofiltration system to generate a second permeate and a second concentrate;
   storing the second concentrate in a second storage tank;
   processing the second concentrate at a seawater processing system to generate a third concentrate and a third permeate, wherein the third concentrate comprises boric acid; and
   storing the third concentrate in a third storage tank.

2. The method of claim 1, wherein the boron solution comprises water, boron, and sulfuric acid ($H_2SO_4$).

3. The method of claim 1, further comprising:
   distributing the first concentrate to a feed water source.

4. The method of claim 3, further comprising:
   passing the first concentrate through a resin bed prior to the distributing the first concentrate to the feed water source, wherein the resin bed comprises boron-selective resin for extracting boron from feed water, wherein a source of the feed water is an irrigation system.

5. The method of claim 1, further comprising:
   adjusting a pH level of the first permeate in the first storage tank to achieve a predetermined pH level.

6. The method of claim 5, wherein the adjusting the pH level of the first permeate in the first storage tank comprises:
   adding a hydroxide to the first permeate in the first storage tank.

7. The method of claim 6, wherein the hydroxide comprises at least one of: potassium hydroxide (KOH) and sodium hydroxide (NaOH).

8. The method of claim 1, further comprising:
distributing the second permeate to a feed water source.

9. The method of claim 1, further comprising:
adjusting a pH level of the second concentrate in the second storage tank to achieve a predetermined pH level.

10. The method of claim 9, wherein the adjusting the pH level of the second concentrate in the second storage tank comprises:
adding a hydroxide to the second concentrate in the second storage tank.

11. The method of claim 10, wherein the hydroxide comprises at least one of: potassium hydroxide (KOH) and sodium hydroxide (NaOH).

12. The method of claim 1, wherein the third permeate is substantially reverse osmosis water.

13. A method for extracting boric acid from a boron solution, the method comprising:
processing the boron solution using a nanofiltration system, wherein the nanofiltration system generates a first permeate and a first concentrate;
storing the first permeate in a first storage tank;
adjusting a pH level of the first permeate in the first storage tank to achieve a predetermined pH level;
polishing the first permeate using the nanofiltration system to generate a second permeate and a second concentrate;
storing the second concentrate in a second storage tank;
adjusting a pH level of the second concentrate in the second storage tank to achieve a predetermined pH level;
processing the second concentrate at a seawater processing system to generate a third concentrate and a third permeate, wherein the third concentrate comprises boric acid;
storing the third concentrate in a third storage tank; and
distributing the first concentrate, the second permeate, and the third permeate to a source of feed water.

14. The method of claim 13, wherein the boron solution comprises water, boron, and sulfuric acid ($H_2SO_4$).

15. The method of claim 13, further comprising:
passing the first concentrate, the second permeate, and the third permeate, through a resin bed prior to the distributing the first concentrate to the source of the feed water, wherein the resin bed comprises boron-selective resin for extracting boron from feed water, wherein the source of the feed water is an irrigation system.

16. The method of claim 13, wherein the adjusting the pH level of the first permeate in the first storage tank comprises:
adding a hydroxide to the first permeate in the first storage tank.

17. The method of claim 13, wherein the adjusting the pH level of the second concentrate in the second storage tank comprises:
adding a hydroxide to the second concentrate in the second storage tank.

18. The method of claim 13, wherein the third permeate is substantially reverse osmosis water.

* * * * *